United States Patent
Sugiyama et al.

(10) Patent No.: US 7,155,072 B2
(45) Date of Patent: Dec. 26, 2006

(54) OPTICAL MODULATOR

(75) Inventors: Masaki Sugiyama, Kawasaki (JP);
Masaharu Doi, Kawasaki (JP); Tadao Nakazawa, deceased, late of Zama (JP); by Yumi Nakazawa, legal representative, Zama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/086,370

(22) Filed: Mar. 23, 2005

(65) Prior Publication Data

US 2005/0213863 A1 Sep. 29, 2005

Related U.S. Application Data

(63) Continuation of application No. PCT/JP2003/000895, filed on Jan. 30, 2003.

(51) Int. Cl.
*G02F 1/035* (2006.01)
(52) U.S. Cl. .................. 385/2; 385/1; 385/14; 385/40; 385/129; 385/130
(58) Field of Classification Search ............ 385/1, 385/2, 3, 42, 39, 40, 18, 24, 16, 17, 14, 15
See application file for complete search history.

(56) References Cited

U.S. PATENT DOCUMENTS

| | | | |
|---|---|---|---|
| 5,148,503 A * | 9/1992 | Skeie ............... | 385/3 |
| 6,038,354 A * | 3/2000 | Sato et al. ........ | 385/2 |
| 6,243,516 B1 | 6/2001 | Seino ............... | 385/47 |
| 6,259,836 B1 * | 7/2001 | Dodds .............. | 385/24 |
| 6,535,320 B1 * | 3/2003 | Burns ............... | 359/245 |
| 6,545,791 B1 * | 4/2003 | McCaughan et al. | 359/245 |
| 6,668,103 B1 * | 12/2003 | Hosoi ............... | 385/2 |
| 2003/0147656 A1 | 8/2003 | Yano ................ | 398/186 |

FOREIGN PATENT DOCUMENTS

| | | |
|---|---|---|
| EP | 0938000 | 8/1999 |
| JP | 5-136734 | * 6/1993 |
| JP | 5-232417 | 9/1993 |
| JP | 11-237517 | 8/1999 |
| JP | 2002-23121 | 1/2002 |

OTHER PUBLICATIONS

Reference AH (Japanese Patent Laid-Open No. 11-237517) corresponds to Reference AA (U.S. Patent No. 6,243,516).
Reference AJ (Japanese Patent Laid Open No. 2002-23121) corresponds to Reference AB (U.S. Appl. No. 2003/0147656).

* cited by examiner

*Primary Examiner*—Brian M. Healy
(74) *Attorney, Agent, or Firm*—Staas & Halsey LLP

(57) ABSTRACT

In relation to an optical modulator (e.g., an RZ optical modulator) formed from a plurality of Mach-Zehnder optical modulators, in an attempt to make the optical modulator compact and realize a low drive voltage, the optical modulator is formed by comprising a plurality of Mach-Zehnder optical modulators, each including a substrate exhibiting an electro-optical effect, an optical waveguide formed on the substrate, and electrodes formed in the vicinity of the optical waveguide. The plurality of Mach-Zehnder optical modulators are arranged on the substrate and connected into multistage.

25 Claims, 6 Drawing Sheets

ELECTRIC CLOCK SIGNAL

OPTICAL CLOCK SIGNAL (40GHz)

ELECTRIC NRZ SIGNAL (40GHz)

OPTICAL RZ SIGNAL (40GHz)

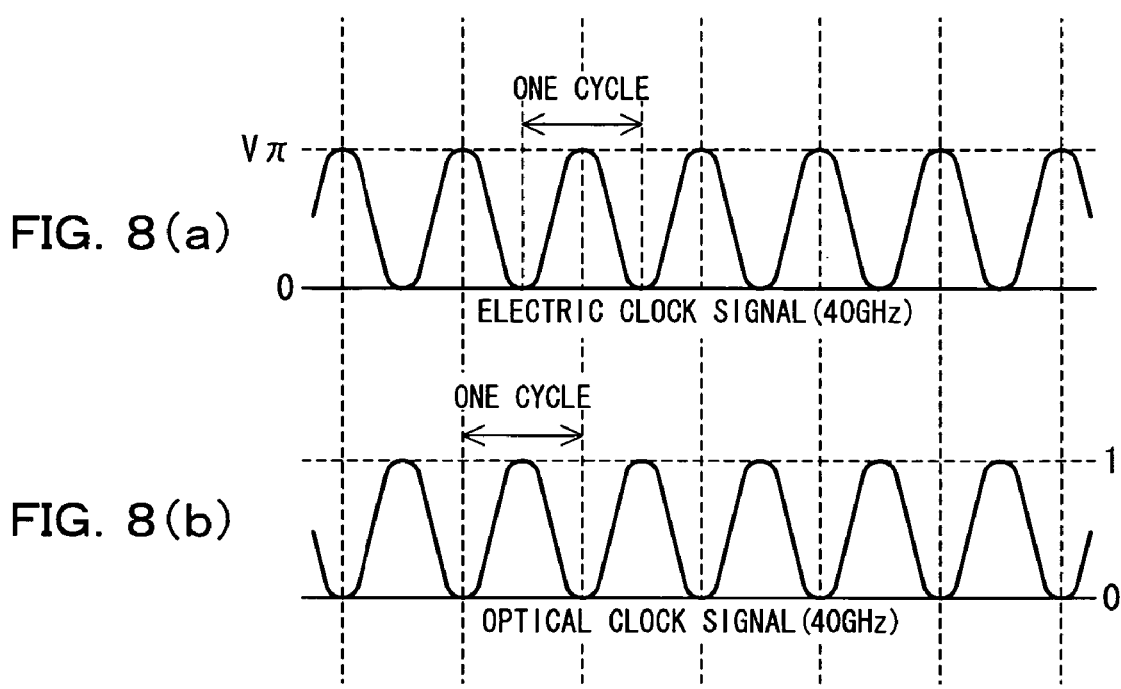

OPTICAL MODULATOR

This application is a continuation application, filed under 35 USC 111(a), of International Application PCT/JP2003/000895, filed Jan. 30, 2003.

FIELD OF THE INVENTION

The present invention relates to an optical modulator used in optical communication.

BACKGROUND

In efforts to realize a ultrahigh-speed, broadband optical communications network, high expectations are placed on an optical modulator (an external modulator) of external modulation system.

Particularly, development of a Mach-Zehnder optical modulator using $LiNbO_3$ (lithium niobate; LN) that exhibits a superior high-speed modulation characteristic and a dispersion-resistant characteristic is pursued to enable long-distance transmission of an optical signal.

As shown in FIG. 10, an RZ optical modulator 100 comprising two Mach-Zehnder optical modulators 101, 102 connected in tandem has recently been put forth as an optical modulator capable of generating an RZ (Return to Zero) signal. This RZ optical modulator 100 can produce an RZ-modulated optical signal by causing an electric signal of a clock (a clock signal) to enter one Mach-Zehnder optical modulator 101 and causing an electric signal of NRZ (Non Return to Zero) data (a data signal) to enter the remaining Mach-Zehnder optical modulator 102.

However, in such an RZ optical modulator 100, the two Mach-Zehnder optical modulators 101, 102 are arranged in series on a substrate (in the longitudinal direction of the substrate). Therefore, when compared with, e.g., an NRZ optical modulator which generates an NRZ signal by inputting an NRZ data signal to one Mach-Zehnder optical modulator, the length of a chip becomes about double.

Therefore, the length of the chip is made as short as possible, to thus render the RZ optical modulator 100 compact. A technique for embodying a compact optical modulator by shortening a chip length is described in, e.g., Japanese Patent Laid-Open NO. HEI 5-232417 and Japanese Patent Laid-Open NO. HEI 11-237517.

Meanwhile, in order to realize a compact RZ optical modulator, for instance, mere shortening of a chip length is conceivable. However, the working length [the length of a portion of the optical modulator where an electric signal (the clock signal or the data signal) acts on the light propagating through the optical waveguide; corresponding to the length of a signal electrode] is limited and shortened by the chip size. Hence, realization of a low driving voltage becomes difficult. Namely, if the working length of the Mach-Zehnder optical modulator is usually made long, the driving voltage can be reduced. However, if the chip length is simply shortened to realize a compact RZ optical modulator, the working length will also become shorter. Hence, even when the RZ optical modulator can have been made compact, difficulty is encountered in realizing a low drive voltage.

SUMMARY OF THE INVENTION

The present invention has been conceived in light of the foregoing problem and provides an optical modulator (e.g., an RZ optical modulator) which is formed from a plurality of Mach-Zehnder optical modulators and enables realization of a low drive voltage while making an attempt to make the optical modulator compact.

To achieve such an object, an optical modulator of the present invention is characterized by including a plurality of Mach-Zehnder optical modulators, each modulator comprising a substrate exhibiting an electro-optical effect, an optical waveguide formed on the substrate, and electrodes formed in the vicinity of the optical waveguide, wherein the plurality of Mach-Zehnder optical modulators are arranged on the substrate in parallel to each other and connected in multistage.

Preferably, a mirror is provided at an end face of the substrate, and the plurality of Mach-Zehnder optical modulators are connected in multistage by way of the mirror.

Moreover, the optical modulator is preferably further provided with a mirror provided on an end face of the substrate; and a multimode optical waveguide for connecting the plurality of Mach-Zehnder optical modulators to the mirror, wherein the plurality of Mach-Zehnder optical modulators are preferably connected in multistage by way of the multimode optical waveguide and the mirror.

Preferably, two Mach-Zehnder optical modulators are further provided as the plurality of Mach-Zehnder optical modulators, and the mirror is preferably disposed at a position shifted from a center line situated at an intermediate position between the two Mach-Zehnder optical modulators.

Preferably, the mirror is also made from reflective coating formed at an end face of the substrate.

Moreover, the reflective coating is preferably a metal film.

Preferably, the reflective coating is a dielectric multilayer film.

The reflective coating is preferably formed at only an area of the end face of the substrate to which the optical waveguide is connected.

Furthermore, the plurality of Mach-Zehnder optical modulators are preferably connected in multistage by way of a fiber.

Preferably, the plurality of Mach-Zehnder optical modulators are connected in multistage by way of a curved waveguide.

In addition, each of the plurality of Mach-Zehnder optical modulators preferably has a working length of 40 mm or more.

An interval between a signal electrode and a ground electrode of the plurality of Mach-Zehnder optical modulators is preferably 50 µm or more.

Preferably, all of electric signal input pads of the plurality of Mach-Zehnder optical modulators are disposed on one side of a chip.

Further, the plurality of Mach-Zehnder optical modulators preferably have bias control electrodes.

Two Mach-Zehnder optical modulators are preferably provided as the plurality of Mach-Zehnder optical modulators; and one of the two Mach-Zehnder optical modulators is preferably configured as a clock modulator, and the other Mach-Zehnder optical modulator is configured as a data modulator.

Preferably, the clock modulator is driven at a frequency which is half a bit rate (an optical clock signal) and a voltage which is double a half-wavelength voltage.

Moreover, the plurality of Mach-Zehnder optical modulators preferably include at least one dual drive modulator.

The dual drive modulator preferably has a delay section in an input section of the signal electrode.

Preferably, the plurality of Mach-Zehnder optical modulators are configured so as to differ from each other in working length.

Furthermore, the plurality of Mach-Zehnder optical modulators are preferably configured so as to differ from each other in terms of an interval between the signal electrode and the ground electrode.

BRIEF DESCRIPTION OF THE DRAWINGS

FIGS. 8(a) and 8(b) are views for describing the optical-modulating operation of the RZ optical modulator according to the embodiment of the present invention;

BEST MODES FOR IMPLEMENTING THE INVENTION

An optical modulator according to an embodiment of the present invention will be described hereunder by reference to FIGS. 1 to 6.

In the present embodiment, an RZ optical modulator [an optical modulator (an optical modulator of clock modulation type) which generates an RZ (Return to Zero) signal by supplying a clock signal and a data signal to input light] is described by reference to FIGS. 1 to 6. The RZ optical modulator is used as, e.g., an optical transmitter in a long-distance optical transmission system.

Figure 1:
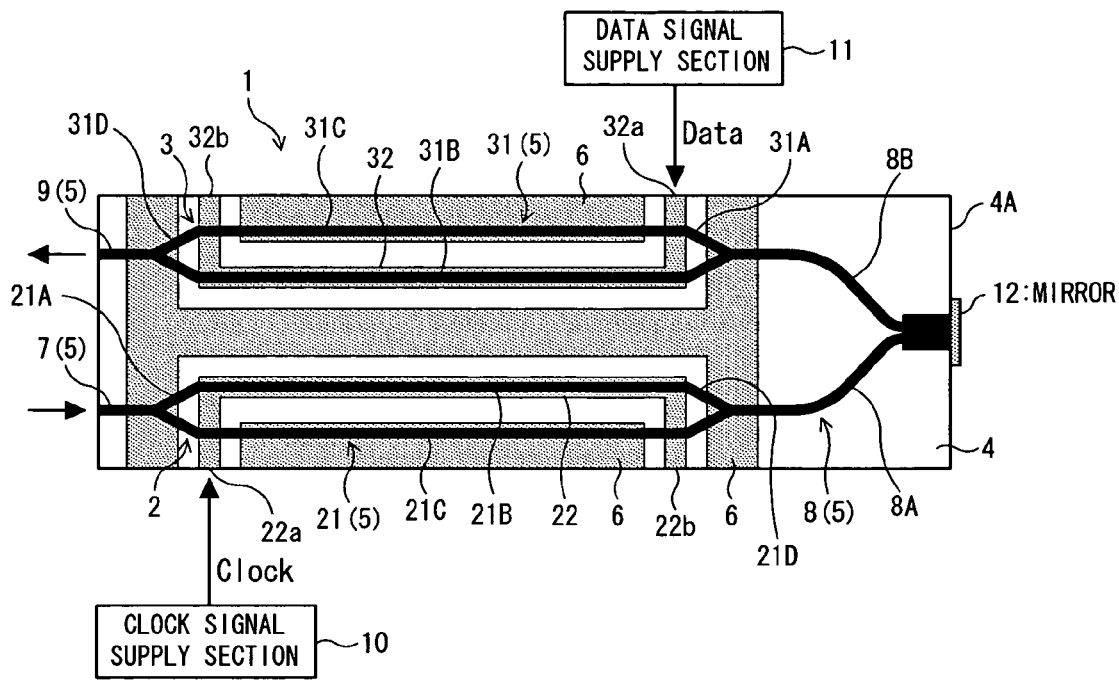
FIG. 1 is a block diagram showing the overall configuration of an RZ optical modulator according to an embodiment of the present invention.

As shown in FIG. 1, in the present embodiment, an RZ optical modulator 1 is configured as having Mach-Zehnder optical modulators (MZ-type LN optical modulators) 2, 3 which are of two stages and use lithium niobate ($LiNbO_3$; LN).

As shown in FIG. 1, the RZ optical modulator 1 has the following structure. An optical waveguide 5 including a first Mach-Zehnder optical waveguide (hereinafter called a first optical waveguide) 21 and a second Mach-Zehnder optical waveguide (hereinafter called a second optical waveguide) 31 is formed on a lithium niobate crystal substrate (LN substrate) 4 sliced by cutting (Z-axis cutting) lithium niobate crystal in a Z axis crystalline direction. A first electrode (signal electrode) 22 is formed in the vicinity of the first optical waveguide 21, and a second electrode (signal electrode) 32 is formed in the vicinity of the second optical waveguide 31. A ground electrode 6 to be shared between the first electrode 22 and the second electrode 32 is formed, whereby the RZ optical modulator is integrated into a single chip.

The first Mach-Zehnder optical modulator 2 (also called a clock modulator, because it modulates a signal into a clock signal) is configured as having the first optical waveguide 21 and the first electrode 22, both being disposed at first stage of the RZ optical modulator 1. The second Mach-Zehnder optical modulator 3 [also called an NRZ modulator or a data modulator, because it modulates a signal into an NRZ (Non Return to Zero) signal] is configured as having the second optical waveguide 31 and the second electrode 32, both being provided in second stage of the RZ optical modulator 1.

Here, lithium niobate crystal is used as a substrate. However, another ferroelectric crystal; e.g., tantalic acid ($LiTaO_2$: LT) crystal, can be used, so long as the substrate exhibits an electro-optic effect.

The RZ optical modulator 1 using a substrate exhibiting an electro-optic effect, such as $LiNbO_3$ crystal or $LiTaO_2$ crystal, is formed by forming a metal film on a portion of the substrate made of, e.g., $LiNbO_3$ crystal or $LiTaO_2$ crystal, and subjecting the film to thermodiffusion; or patterning the metal film, forming an optical waveguide by subjecting the metal film to proton exchange in benzoin, and forming electrodes in the vicinity of the optical waveguide.

Specifically, when $LiNbO_3$ crystal is used for a substrate, a titanium film (Ti film) is patterned on the substrate in agreement with a desired optical waveguide geometry. The substrate in this patterned state is thermally diffused by being heated at 1050° C. for seven to ten hours, thereby forming an optical waveguide.

As shown in FIG. 1, the optical waveguide 5 is configured as having an input optical waveguide 7, the first Mach-Zehnder optical waveguide 21, an intermediate optical waveguide 8, the second Mach-Zehnder optical waveguide 31, and an output optical waveguide 9.

As shown in FIG. 1, of these components, the first Mach-Zehnder optical waveguide 21 is configured as having a light-incedence-side Y-branch optical waveguide 21A connected to the input optical waveguide 7, two parallel linear optical waveguides (parallel waveguides) 21B, 21C, and a light-emitting-side Y-branch optical waveguide 21D connected to the intermediate optical waveguide 8.

As shown in FIG. 1, the second Mach-Zehnder optical waveguide 31 is configured as having a light-incidence-side Y-branch optical waveguide 31A connected to the intermediate optical waveguide 8, two parallel linear optical waveguides (parallel waveguides) 31B, 31C, and a light-emitting-side Y-branch optical waveguide 31D connected to the output optical waveguide 9.

The layout of the first and second optical waveguides 21 and 31 and the configuration of the intermediate optical waveguide characterize the present invention, and therefore will be described in detail later.

As shown in FIG. 1, a portion of the first electrode 22 constitutes the first optical waveguide 21 and is provided so as to overlap the linear optical waveguide 21B. As shown in FIG. 1, the second electrode 32 is provided so as to overlap the linear optical waveguide 31B, a portion of which constitutes the second optical waveguide 31. Reference numerals 22a, 22b, 32a, and 32b designate connection pads serving as connector contact points of the first and second electrodes 22 and 32. Of these connection pads, the connection pads 22a, 32a used for inputting a clock signal and a data signal are in particular called input pads (electric signal input pads or RF input pads).

As shown in FIG. 1, the ground electrodes 6 are provided in close proximity to both sides of the first and second electrodes serving as signal electrodes such that the first and second electrodes 22, 32 are sandwiched between the ground electrodes 6 with a predetermined interval therebetween, to thus constitute a coplanar-type electrode (coplanar electrode).

An interval between the first electrode 22 and the ground electrode 6, both belonging to the clock modulator 2, may be made equal to or different from an interval between the second electrode 32 and the ground electrode 6, both belonging to the data modulator 3. For instance, two Mach-Zehnder modulators may be made different from each other in terms of an interval between the signal electrode and the ground electrode.

Moreover, as shown in FIG. 1, a clock signal supply section (signal supply section) 10 which supplies a sinusoidal wave electric signal having a frequency of, e.g., 20 GHz (a microwave signal or a high frequency signal) as a clock signal, is connected to the first electrode 22. Since the clock signal supply section 10 is for driving the clock modulator 2 using a clock signal, the clock signal supply section 10 is also called a clock signal drive section (e.g., a drive circuit).

Figure 7A:
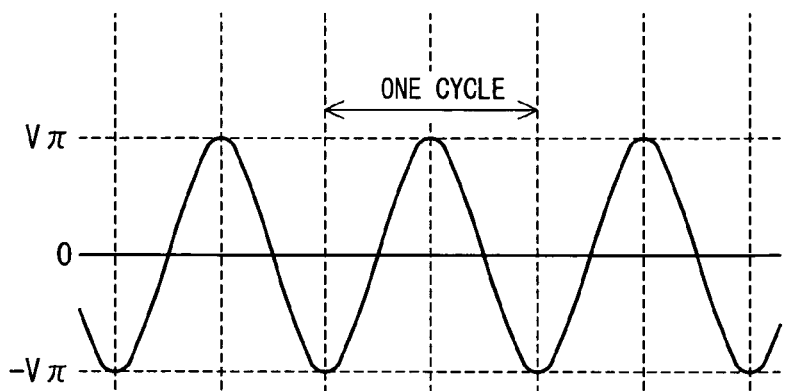
FIGS. 7(a) to 7(f) are views for describing optical-modulating operation of the RZ optical modulator according to the embodiment of the present invention.
Figure 7B:
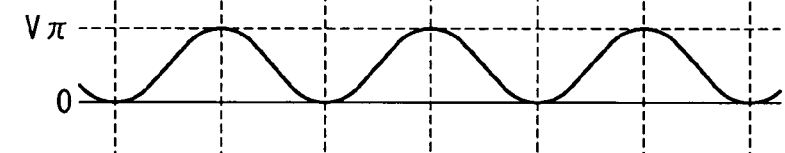
Figure 7C:
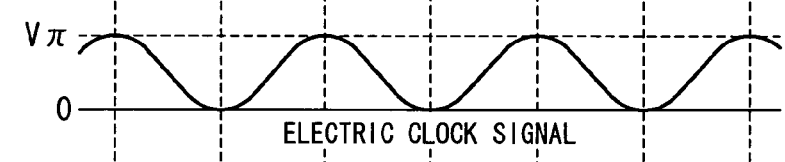
Figure 7D:
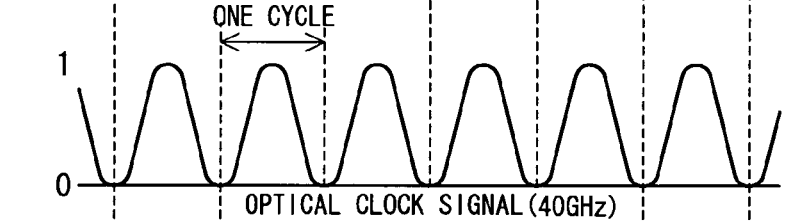

Here, the electric clock signal is given a frequency (20 GHz) which is half a bit rate (an optical RZ signal) of an optical clock signal [40 GHz: see, e.g., FIG. 7(d)]. Hence, a clock signal voltage (drive voltage) which is to be applied to the first electrode 22 through use of an electric clock signal is set to a voltage $2V\pi$ (e.g., $-V\pi$ to $+V\pi$) that is double a half-wavelength voltage $V\pi$ [see, e.g., FIG. 7(a)]. Specifically, when the voltage $2V\pi$ that is double the half-wavelength voltage $V\pi$ is applied to the first electrode 22 as a drive voltage through use of the electric clock signal of 20 GHz, the clock modulator 2 outputs an optical clock signal of 40 GHz on the basis of a modulation curve shown in FIG. 9.

In a case where the electric clock signal is given the frequency (40 GHz) identical with the bit rate (an optical RZ signal) of the optical clock signal [40 GHz; see, e.g., FIG. 8(b)], the essential requirement is to set the clock signal voltage (a drive voltage) to the half wavelength voltage $V\pi$ [see, e.g., FIG. 8(a)]. In this case, when $V\pi$ is applied to the first electrode 22 through use of the electric clock signal of 40 GHz, the essential requirement is to configure the clock modulator 2 so as to output an optical clock signal of 40 GHz in accordance with the electric clock signal of 40 GHz.

A clock signal is supplied from the clock signal supply section 10 to the first electrode 22, and voltages (the clock signal voltage and the signal voltage) corresponding to the clock signal are applied to the linear optical waveguides 21B, 21C, thereby inducing an electric field in the linear optical waveguides 21B, 21C to change, e.g., the refractive index of the linear optical waveguides 21B, 21C as $+\Delta n$ or $-\Delta n$. As a result, a phase difference arises between lights propagating through the linear optical waveguides 21B, 21C. The lights in which the phase difference has arisen are subjected to interference through coupling, whereby, e.g., an optical clock signal of 40 GHz [i.e., a signal modulated into an RZ data signal of 40 Gb/s (an optical RZ signal) having a data array of "1," "1," "1," . . . ; see, e.g., FIG. 7(d)] is output toward the second optical waveguide 31 by way of the intermediate optical waveguide 8.

In order to drive the first optical modulator 2 at high speed, the only requirement is to connect a terminal of the first electrode 22 serving as a signal electrode to a terminal of the ground electrode 6 by means of a resistor (a terminator), to thus form a progressive-wave electrode. Especially, effective refractive indices of the linear optical waveguides 21B, 21C are controlled by changing the cross-sectional profile of the first electrode 22, in order to match the lights propagating through the linear optical waveguides 21B, 21C with the speed of the microwave supplied to the first electrode 22, so that a broadband optical response characteristic can be acquired.

Figure 7E:
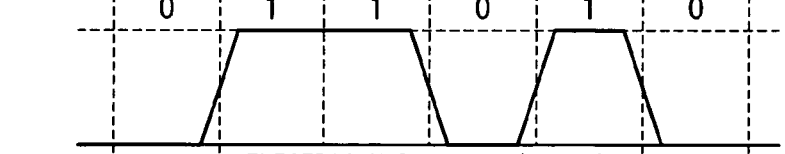

Meanwhile, as shown in FIG. 1, the second electrode 32 is connected to an NRZ data signal supply section (signal supply section) 11 which supplies an NRZ data signal [an electric signal: see, e.g., FIG. 7(e)] of, e.g., 40 Gb/s at a timing synchronous with, e.g., an optical clock signal of 40 GHz output from the first optical modulator 2. The NRZ data signal supply section 11 is for driving the data modulator 3 using the data signal, and, therefore, is also called a data signal drive section (e.g., a drive circuit).

Figure 7F:
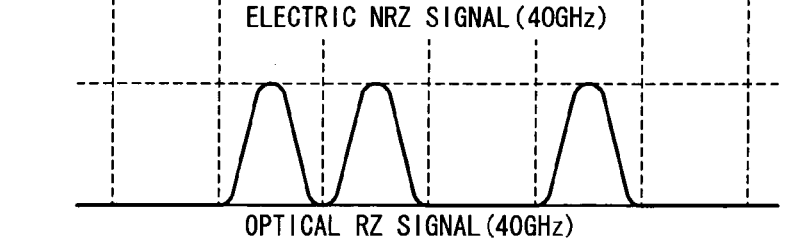

The NRZ data signal is supplied from the NRZ data signal supply section 11 to the second electrode 32, and voltages (an NRZ data signal voltage, and a signal voltage) in response to the NRZ data signal are applied to the linear optical waveguides 31B, 31C, thereby inducing an electric field in the linear optical waveguides 31B, 31C to change, e.g., the refractive index of the linear optical waveguides 31B, 31C as $+\Delta m$ or $-\Delta m$. As a result, a phase difference is caused to arise between lights propagating through the linear optical waveguides 31B, 31C. The lights in which the phase difference has a risen are subjected to interference through coupling, whereby, e.g., an optical RZ data signal of 40 Gb/s [a modulated signal; see, e.g., FIG. 7(f)] is output, by way of the output optical waveguide 9, as signal light whose intensity has been modulated.

In order to drive the second optical modulator 3 at high speed, the only requirement is to connect a terminal of the second electrode 32 serving as a signal electrode to a terminal of the ground electrode 6 by means of a resistor (a terminator), to thus form a progressive-wave electrode. Especially, effective refractive indices of the linear optical waveguides 31B, 31C are controlled by changing the cross-sectional profile of the second electrode 32, in order to match the lights propagating through the linear optical waveguides 31B, 31C with the speed of the microwave supplied to the second electrode 32, so that a broadband optical response characteristic can be acquired.

As shown in FIG. 1, in the present embodiment, the Z-axis-cut lithium niobate crystal substrate 4 is used. In order to utilize the change in refractive index attributable to the electric field in the direction of the Z axis, the first electrode 22 and the ground electrode 6 are formed at positions immediately above the linear waveguides 21B, 21C of the first optical waveguide 21; and the second electrode 32 and the ground electrode 6 are formed at positions immediately above the linear waveguides 31B, 31C of the second optical waveguide 31.

As mentioned above, in the present embodiment, because the linear waveguides 21B, 21C, 31B, and 31C are patterned at positions immediately above the first electrode 22, the second electrode 32, and the ground electrode 6, there is a possibility that the lights propagating through the linear optical waveguides 21B, 21C, 31B, and 31C are absorbed by the electrodes 22, 32, and 6. To eliminate this chance, in the present embodiment, a buffer layer (a layer of dielectric substance) is formed between the LN substrate 4 and the electrodes 22, 32, and 6. The only requirement is to form the buffer layer as, e.g., an SiO$_2$ film, and to a thickness of 0.2 to 1 µm or thereabouts.

For this reason, the RZ optical modulator 1 is configured such that a buffer layer which is thinner than the substrate 4 is stacked between the substrate 4, and the first, second electrodes 22, 32, and the ground electrode 6.

In the embodiment, the RZ optical modulator 1 is configured as mentioned previously, and hence the input light originating from an unillustrated light source (semiconductor laser) is guided into the first optical waveguide 21 (the first optical modulator 2) by way of the input optical waveguide 7. After having been modulated in accordance with a desired clock signal (an electric signal) during the course of propagating through the first optical waveguide 21, the light is guided to the second optical waveguide 31 (the second optical modulator 3) by way of the intermediate optical waveguide 8 connected with the output side of the first optical waveguide 21. The light is output as modulated output light (signal light, or an optical NR signal) by way of the output optical waveguide 9 connected with the output side of the second optical waveguide 31.

In the embodiment, the first optical modulator 2 and the second optical modulator 3 are configured as having the signal electrodes 22, 32 and the ground electrode 6. In addition, the modulators 2, 3 may also be configured as having a bias electrode (a bias control electrode) in the first optical waveguide 21 and/or the second optical waveguide 31. In this case, the only requirement is to connect a bias control section (e.g., a bias control circuit) to the bias electrode and to supply a bias voltage (DC voltage) to the bias electrode by way of the bias control section, thereby supplying the bias voltage (DC voltage) to the first optical waveguide 21 and/or the second optical waveguide 31. It may also be possible to cause the bias control section to perform feedback control for controlling the bias voltage in accordance with the intensity of monitoring light, to thus compensate for fluctuations in the operating point voltage of the first optical modulator 2 and/or the second optical modulator 3.

In the above-configured RZ optical modulator, the drive voltage can be held low as the length (working length) of the portion of the optical modulator where the electric signals (the clock signal and the data signal) act on the light propagating through the optical waveguides is made longer. Hence, there is a desire to realize a low drive voltage while making an attempt to make the length of the chip as short as possible for miniaturizing and the working length as long as possible.

The working length includes the length of an overlapping area between the first electrode 22 and the linear optical waveguide 21B, the length of an overlapping area between the ground electrode 6 and the linear optical waveguide 21C, the length of an overlapping area between the second electrode 32 and the linear optical waveguide 31B, and the length of an overlapping area between the ground electrode 6 and the linear optical waveguide 31C.

Therefore, as shown in FIG. 1, in this embodiment the plurality of ("two" in this embodiment) Mach-Zehnder optical modulators 2, 3 are arranged in parallel on the substrate 4 in multistage (in series in the propagating direction of light).

Specifically, as shown in FIG. 1, the first optical waveguide 21 and the second optical waveguide 31 are formed so as to be arranged in parallel along the longitudinal direction of the substrate 4, and a mirror (reflection section) 12 is disposed on an end face 4A of the substrate 4 to divide the intermediate optical waveguide 8 into an incidence-side portion 8A and an emitting-side portion 8B. The incidence-side portion 8A and the emitting-side portion 8B are connected by way of the mirror 12, whereby the two Mach-Zehnder optical modulators 2, 3 are connected in multistage.

Figure 2A:
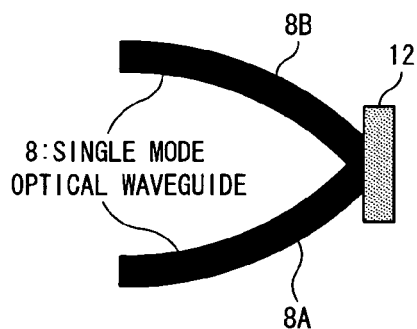
FIGS. 2(a) and 2(b) are schematic diagrams showing a mirror section of the RZ optical modulator according to the embodiment of the present invention.

For example, as shown in FIG. 2(a), the only requirement is to configure the intermediate waveguide 8 as an optical waveguide for single mode (i.e., a single-mode optical waveguide, or a curved waveguide) (in this case the first optical waveguide 21 and the second optical waveguide 31 are also configured as single-mode optical waveguides) such that both the incidence-side portion 8A and the emitting-side portion 8B of the intermediate optical waveguide 8 are connected to the substrate end face 4A at predetermined angles. In this case, the light having propagated from the first optical modulator 2 by way of the incidence-side portion 8A of the intermediate optical waveguide 8 obliquely enters the substrate end face 4A at a predetermined angle. The light undergoes reflection on the substrate end face 4A acting as a mirror, and the reflected light propagates through the second optical modulator 3 by way of the emitting-side portion 8B of the intermediate optical waveguide 8.

Figure 2B:
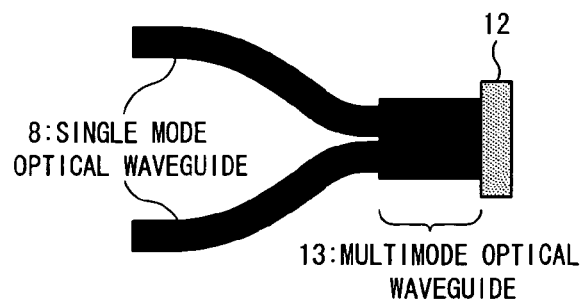

As shown in FIG. 2(b), the intermediate optical waveguide 8 may also be configured as an optical waveguide for single mode (a single-mode optical waveguide or a curved waveguide) (in this case the first optical waveguide 21 and the second optical waveguide 31 are also configured as single-mode optical waveguides), and the intermediate optical waveguide 8 and the mirror 12 may be connected together by way of a multi-mode optical waveguide (a multi-mode optical waveguide) 13 in order to utilize the interference arising between modes. In this case, the first optical modulator 2 and the second optical modulator 3 are connected by way of the multi-mode optical waveguide 13 and the mirror 12. The light having propagated through the first optical waveguide 21 constituting the first optical modulator 2 enters the substrate end face 4A at right angles or substantially at right angles by way of the multi-mode optical waveguide 13. The thus-incident light undergoes reflection on the substrate end face 4A acting as a mirror and propagates through the second optical waveguide 31 constituting the second optical modulator 3, by way of the multi-mode optical waveguide 13.

Here, both the incidence-side portion and the emitting-side portion of the intermediate waveguide 8 are configured as curved waveguides; but the invention not limited to this configuration. Either the incidence-side portion or the emitting-side portion of the intermediate optical waveguide 8 may be configured as a curved waveguide, and the remaining portion configured as a linear optical waveguide. Also, both the incidence-side portion and the emitting-side portion of the intermediate optical waveguide 8 may be configured as a liner optical waveguide. In this case, the first optical waveguide 21 and the second optical waveguide 31 are disposed obliquely relative to the substrate end face 4A.

When the substrate end face 4A (particularly, the area where the intermediate optical waveguide 8 is connected) is caused to act as a mirror, the substrate end face 4A (particularly, the area where the intermediate optical waveguide 8 is connected) acts as the mirror 12 to be disposed at the substrate end face 4A.

Preferably, the mirror 12 disposed at the substrate end face 4A is configured as a reflection coating formed by coating the substrate end face 4A with, e.g., a metal film or a dielectric multilayer film.

Particularly, the mirror 12 is preferably formed only on the area of the substrate end face 4A to which the intermediate optical waveguide 8 is connected, thereby forming the mirror 12 at only this area. In this case, the only requirements are to form a reflection coating over the entire surface of the substrate end face 4A; to leave the reflection coating at the area of the substrate end face 4A where the intermediate optical waveguide 8 is connected; and to remove the reflection coating from the other area. As a result, the reflection coating is formed in only the area of the substrate end face 4A where the intermediate optical waveguide 8 is connected, thereby preventing the light radiated from the optical waveguide 5 (e.g., the Y-branch optical waveguide 21D of the first optical waveguide 21) from being reflected by the substrate end face 4A, which would otherwise affect the signal light. So long as the reflection coating is formed in only the area of the substrate end face 4A where the intermediate optical waveguide 8 is connected, a photodetector for detecting monitoring light can be disposed at the substrate end face 4A in order to perform bias control operation.

Although the two Mach-Zehnder optical modulators 2, 3 are connected in multistage by causing the mirror 12 provided at the substrate end face 4A to reflect light, the configuration is not limited to multistage connection.

Figure 3:
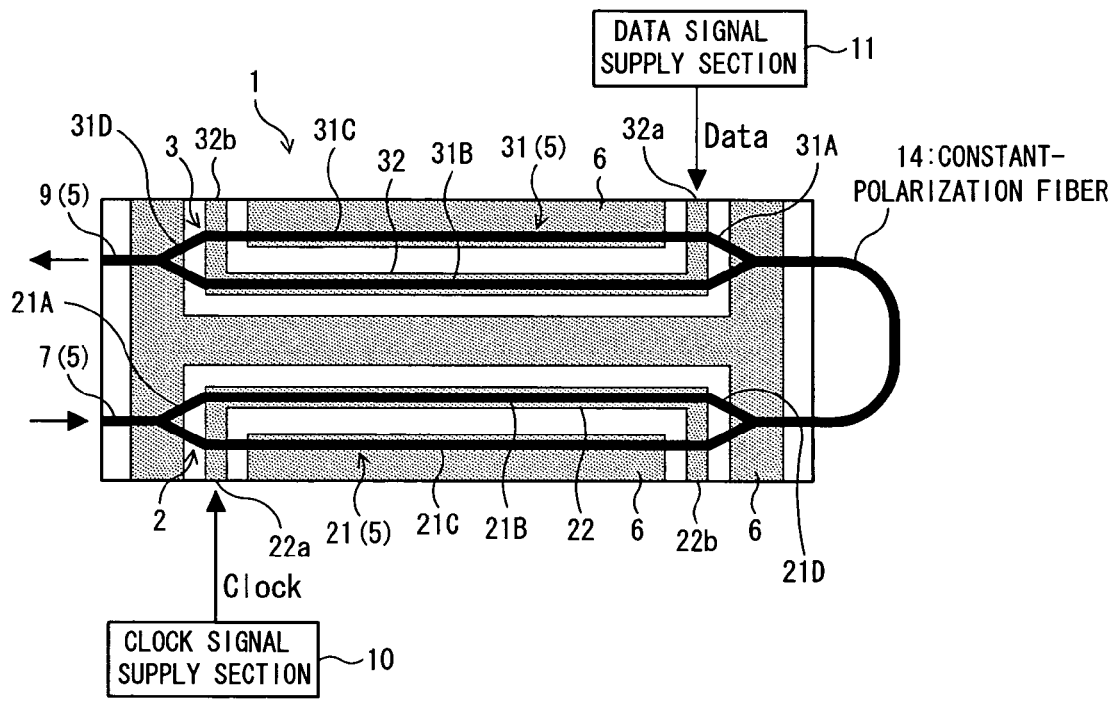
FIG. 3 is a schematic diagram showing a modification of the RZ optical modulator according to the embodiment of the present invention.

For instance, as shown in FIG. 3, in another possible configuration, the first optical waveguide 21 and the second optical waveguide 31 are formed on the substrate 4 so as to be arranged in parallel on the substrate 4 (along the longitudinal direction of the substrate 4) without the intermediate optical waveguide; and the fiber (e.g., a constant-polarization fiber) 14 is attached to the substrate end face 4A so as to connect the Y-branch optical waveguide 21D disposed at the output side of the first optical modulator 2 to the Y-branch optical waveguide 31A disposed at the input of the second optical modulator 3, thereby connecting the two Mach-Zehnder optical modulators 2, 3 in multistage.

Figure 4:
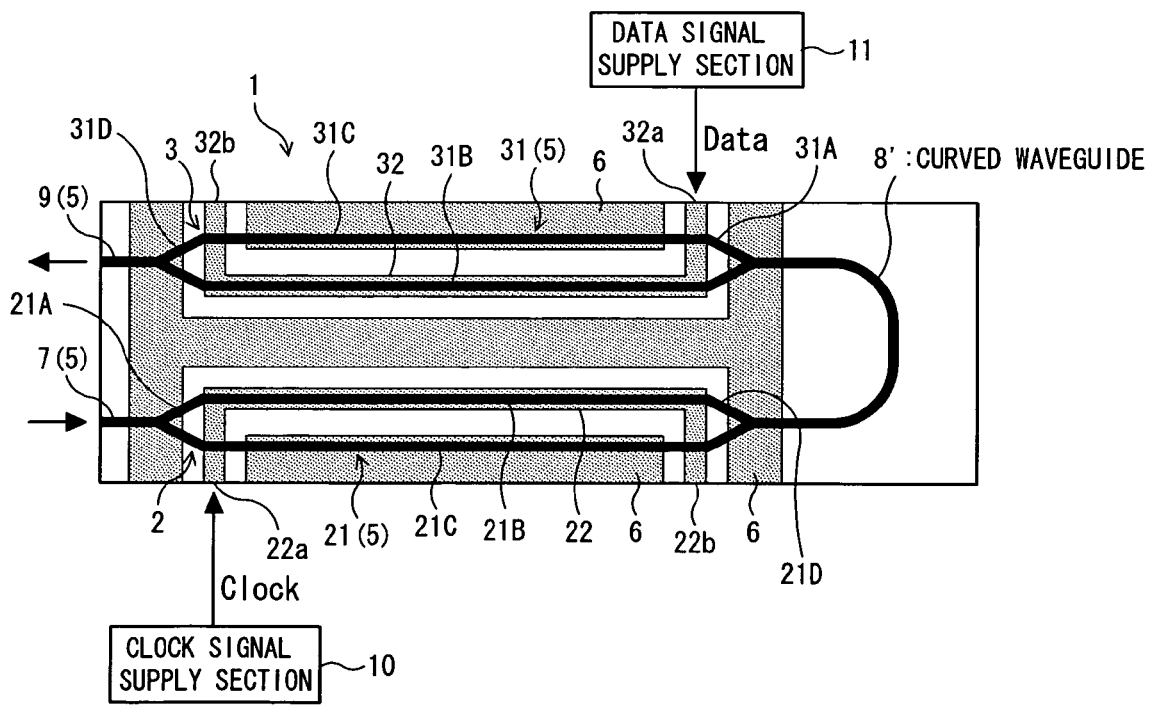
FIG. 4 is a schematic diagram showing another modification of the RZ optical modulator according to the embodiment of the present invention.

Alternatively, as shown in FIG. 4, the first optical waveguide 21 and the second optical waveguide 31 may be formed on the substrate 4 such that the waveguides are arranged in parallel on the substrate 4 (in the longitudinal direction of the substrate 4); and the intermediate optical waveguide 8 formed as a curved waveguide 8' which connects the Y-branch optical waveguide 21D disposed at the output side of the first optical modulator 22 to the Y-branch optical waveguide 31 disposed at the input side of the second optical modulator 3 without coming into contact with the substrate end face 4A, thereby connecting the two Mach-Zehnder optical modulators 2, 3 in multistage.

Incidentally, when the chip size is made compact by shortening the chip length as mentioned previously, it becomes important to broaden the interval between the signal electrodes 22, 32 and the ground electrode 6 as wide as possible in order to ensure a modulation band.

When the invention is applied to, e.g., a modulator of 40 Gb/s, as in the case of the present embodiment, the interval between the signal electrodes 22, 32 and the ground electrode 6 should preferably be set to about 50 µm or more. As a result, a loss in the microwave can also be reduced. The signal electrodes 22, 32 and the ground electrode 6 can also be called RF electrodes.

When the interval between the signal electrodes 22, 32 and the ground electrode 6 is set to about 50 µm or more, a loss in the microwave can be reduced. Hence, the working length of the modulator can be extended to 40 mm or more (preferably 50 mm or more). In this case, a low drive voltage of 3 V or less (a predetermined voltage or less) can be realized. Thereby, the working length can be extended to a predetermined length or more while making the chip size compact (shortening the chip length), thereby enabling realization of a low drive voltage.

Therefore, the RZ optical modulator of the present embodiment yields an advantage of the RZ optical modulator 1 formed from the plurality of (two in the embodiment) Mach-Zehnder optical modulators being able to realize a low drive voltage in pursuit of miniaturization.

Figure 5:
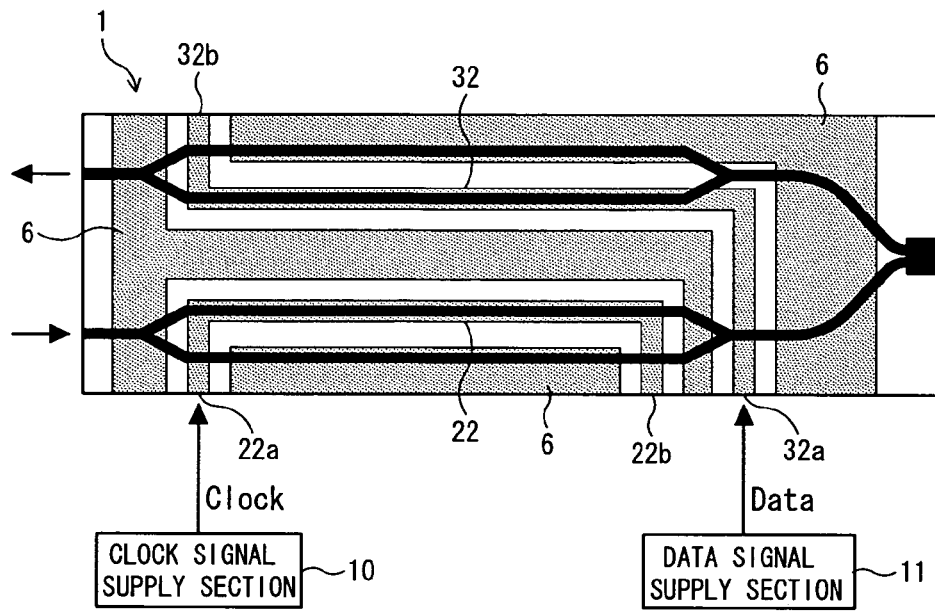
FIG. 5 is a schematic diagram showing yet another modification of the RZ optical modulator according to the embodiment of the present invention.

As shown in FIG. 1, in the previously-described embodiment, the two input pads (the input pad 22a used for inputting a clock signal and the input pad 32a used for inputting a data signal) are disposed on opposite sides (i.e., on both sides) of the chip. However, as shown in FIG. 5, the two input pads 22a, 32a may be disposed on one side of the chip, by forming the signal electrodes 22, 32 and the ground electrode 6. As a result, all of the connectors connected to the two input pads 22a, 32a may be arranged on one side of the optical modulator 1, thereby reducing the area which is occupied by the optical modulator module required during implementation.

In the previously-described embodiment, each of the two Mach-Zehnder optical modulators 2, 3 constituting the RZ optical modulator 1 is configured to have one signal electrode (a single electrode) and as a single-drive-type optical modulator (a single drive modulator). However, the optical modulators are not limited to these configurations.

For instance, in order to reduce a drive voltage, each of the two Mach-Zehnder optical modulators 2, 3 may be configured to have two signal electrodes (dual electrodes) and as a dual-drive-type optical modulator (dual drive modulator). Alternatively, one of the two Mach-Zehnder optical modulators 2, 3 may be configured to have two signal electrodes (dual electrodes) and as a dual-drive-type optical modulator (a dual drive modulator).

In the previously-described embodiment, the clock modulator 2 is disposed in the first stage, and the data modulator 3 is disposed in the second stage. However, the modulators are not limited to this configuration. For example, the data modulator 3 may be disposed in the first stage, and the clock modulator 2 may be disposed in the second stage. In the previously-described embodiment, two Mach-Zehnder optical modulators are provided, but the number of optical modulators is not limited to two. A plurality of optical modulators may be connected in multistage.

Figure 6:
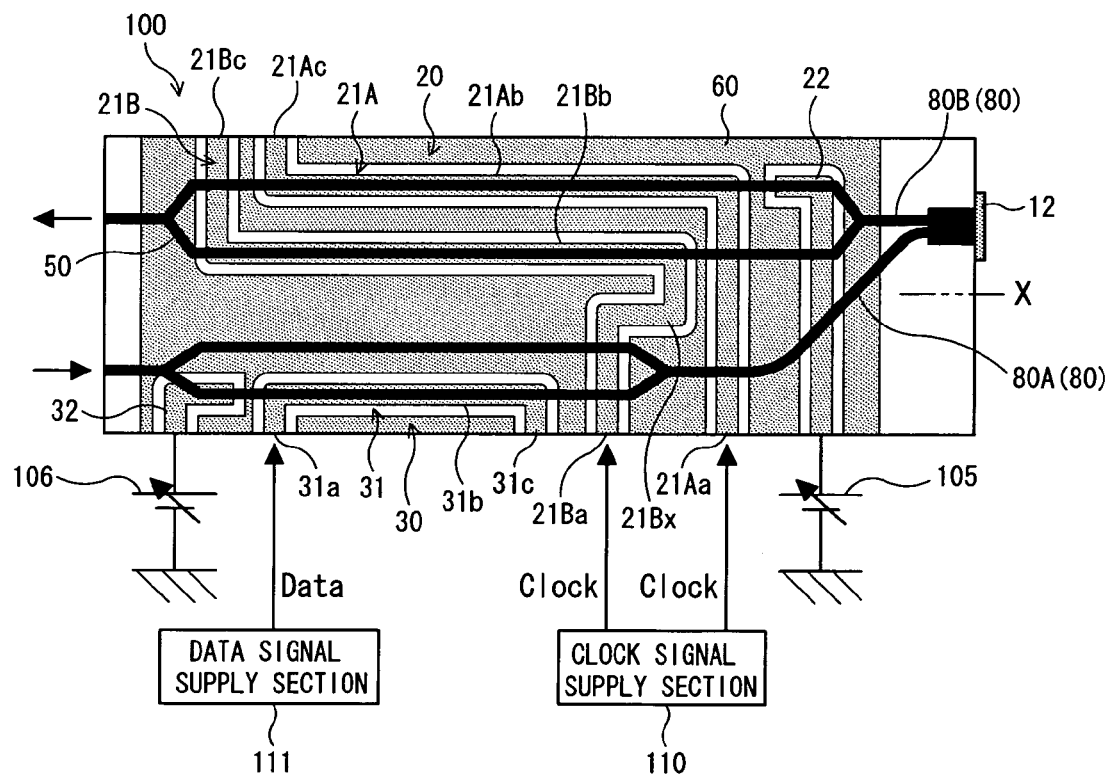
FIG. 6 is a schematic diagram showing still another modification of the RZ optical modulator according to the embodiment of the present invention.

For example, FIG. 6 shows an example RZ optical modulator in which a dual drive modulator and a single drive modulator are combined.

Here, as shown in FIG. 6, the data modulator 30 is disposed in the first stage, and the clock modulator 20 is disposed in the second stage. The data modulator 30 is embodied as a single drive modulator, and the clock modulator 20 is embodied as a dual drive modulator, to thus constitute the RZ optical modulator 100. The RZ optical modulator is identical in configuration with that of the previously-described embodiment, except for the following configuration.

When one Mach-Zehnder optical modulator is embodied as a dual drive modulator and the other Mach-Zehnder optical modulator is embodied as a single drive modulator, the interval between the two Mach-Zehnder optical modulators 20, 30 (at least an interval between mutually-acting areas of the modulators) is preferably set to about 100 µm to about 2 mm in order to prevent microwaves from interfering with each other. As in the previous-described embodiment, even when the two Mach-Zehnder optical modulators are embodied as single drive modulators, the interval between the two Mach-Zehnder optical modulators should preferably be set to 100 µm to 2 mm.

Specifically, as shown in FIG. 6, two signal electrodes 21A, 21B provided in the clock modulator (second modulator) acting as a dual drive modulator comprise: sections 21Aa, 21Ba (an input section, and an electric signal input section) where a clock signal is input; sections 21Ab, 21Bb (a working section, and a mutually-working section; the length of these sections is called a "working length") overlapping an optical waveguide 50 (specifically a linear optical waveguide of a Mach-Zehnder optical waveguide); and sections 21Ac, 21Bc (an output section and an electric signal output section) from which a clock signal is output.

Particularly, in order to match phases of signals (clock signals) supplied to the two signal electrodes 21A, 21B provided in the dual drive modulator 20 with each other, the input section 21Ba of the one signal electrode 21B is provided with a curved section 21Baa. The curved section 21Baa is provided for delaying a signal and hence is also called a delay section (delay line).

The interval between the signal electrode and the ground electrode of the data modulator may be made equal to or differ from the previously-described interval between the signal electrode and the ground electrode of the clock modulator. For example, the interval between a signal electrode and a ground electrode may differ between two Mach-Zehnder optical waveguides.

In addition to being provided with the RF electrodes formed from the signal electrodes 21A, 21B and a ground electrode 60, the clock modulator 20 is provided with a bias electrode (bias control electrode) 22, and can effect bias control by way of a bias control section 105.

Likewise, the data modulator (second modulator) 30 acting as a single drive modulator is configured such that the signal electrode 31 comprises an input section 31a, a mutually-working section 31b, and an output section 31c. The signal electrode 31 is also connected to a data signal supply section 111. In addition to the RF electrode formed from the signal electrode 31 and the ground electrode 60, the data modulator is provided with a bias electrode (bias control electrode) 32, and can effect bias control by way of a bias control section 106.

In the previously-described embodiment each of the clock modulator 20 and the data modulator 30 is configured to have the bias electrode. However, the modulators are not limited to these configurations. For instance, each of the clock modulator 20 and the data modulator 30 may be configured as a modulator do not have a bias electrode.

The clock modulator 20 and the data modulator 30 may be identical or may differ from each other in terms of an interval between the mutually-working sections (a gap between electrodes). The same also applies to the case where the RZ optical modulator is configured as in the case of the previously-described embodiment.

The mutually-working sections 21Aa, 21Bb, and 31b of the clock modulator 20 and the data modulator 30 may be identical or may differ from each other in terms of a length (a working length). For instance, the lengths (working lengths) of the mutually-working sections 21Ab, 21Bb of the two signal electrodes 21A, 21B provided in the clock modulator 20 may be made equal to each other, and the length of the mutually-working section 31b of the signal electrode 31 disposed in the data modulator 30 may be made different. In short, the two Mach-Zehnder optical modulators 20, 30 may be configured so as to differ from each other in terms of working length. For example, the lengths (working lengths) of the mutually-working sections 21Ab, 21Bb, and 31b of the three signal electrodes 21A, 21B, and 31 may be made different from each other. The same also applies to a case where the RZ optical modulator is configured as in the previously-described embodiment.

Drive voltages used for driving the signal electrodes 21A, 21B, and 31 and bands of electric signals supplied to the signal electrodes 21A, 21B, and 31 may be set arbitrarily according to applications. The same also applies to the case where the RZ optical modulator is configured as in the previously-described embodiment.

Particularly, when the clock modulator 20 is driven at a frequency which is half the bit rate (an optical RZ signal) of the optical clock signal [see FIG. 7(d)] and at a voltage 2Vπ (e.g., −Vπ to +Vπ) which is double the half-wavelength voltage Vπ [see, e.g., FIG. 7(a); wherein, since a dual drive is used, a drive voltage (clock signal voltage) applied to one signal electrode is Vπ; see FIGS. 7(b) and (c)], the modulator is preferably designed such that a drive voltage becomes low while sacrificing a band as in the case of, e.g., a CS-RZ (Carrier Suppressed Return to Zero) modulation system (e.g., reducing the frequency of an optical clock signal obtained as an optical output signal from 40 GHz to 20 GHz).

As shown in FIG. 6, the clock modulator 20 is formed as a dual drive modulator and has the two signal electrodes 21A, 21B. Therefore, the two signal electrodes 21A, 21B are connected to a clock signal supply section (a signal supply section) 110 which supplies, for example, a sinusoidal wave electric signal [see FIG. 7(b)] having a frequency of 20 GHz as a clock signal to one signal electrode and which supplies a sinusoidal wave electric signal [see FIG. 7(c)]—which has a frequency of 20 GHz and is delayed by a time corresponding to a predetermined phase (180 degrees)—as a clock signal to the other signal electrode. Therefore, the clock signal supply section 110 is configured as having a phase delay section. The clock signal supply section 110 drives the clock modulator 20 using a clock signal and, hence, is also called a clock signal drive section (e.g., a drive circuit).

The clock signal voltage (drive voltage) having a half-wavelength voltage Vπ is applied to the respective signal electrodes 21A, 21B using the clock signal. As a result, the electric clock signal is applied to the Mach-Zehnder optical waveguides at a frequency which is half the bit rate (an optical RZ signal) of the optical clock signal [40 GHz; see, e.g., FIG. 7(d)] and at a voltage 2Vπ (e.g., −Vπ to +Vπ) which is double the half-wavelength voltage Vπ [see, e.g., FIG. 7(a)].

Figure 9:
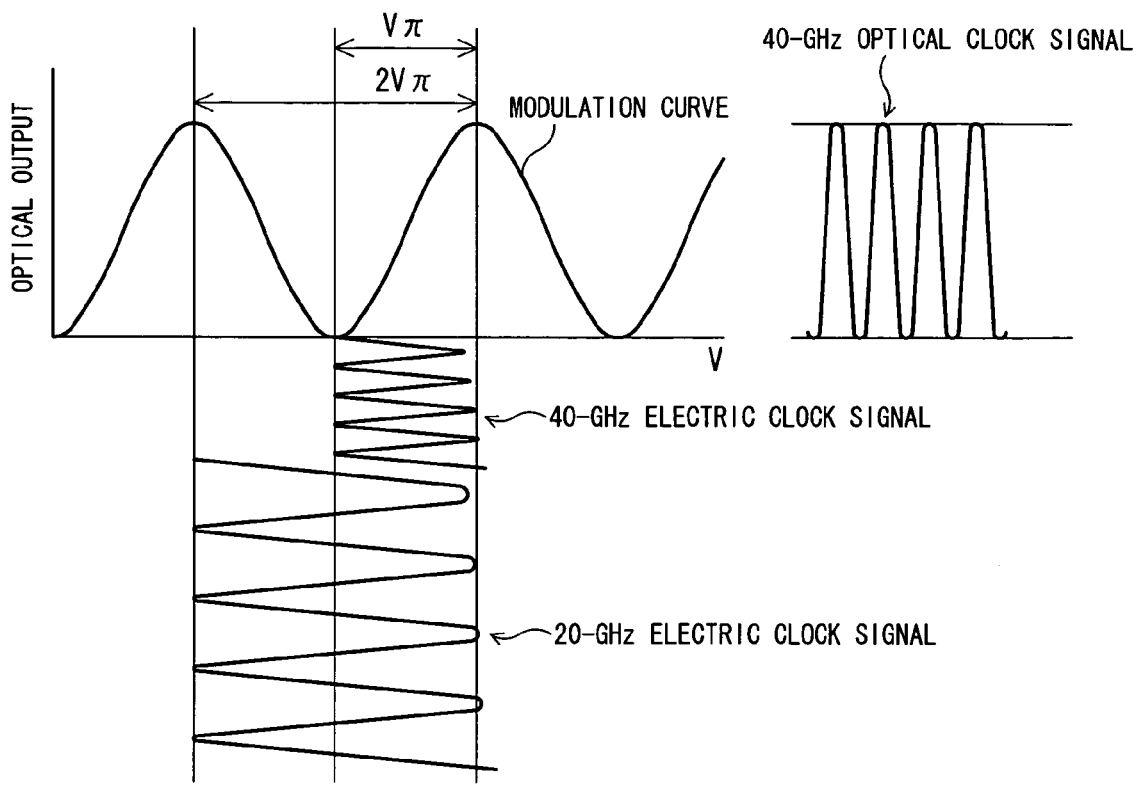
FIG. 9 is a view for describing optical-modulating operation of the RZ optical modulator according to the embodiment of the present invention.
Figure 10:
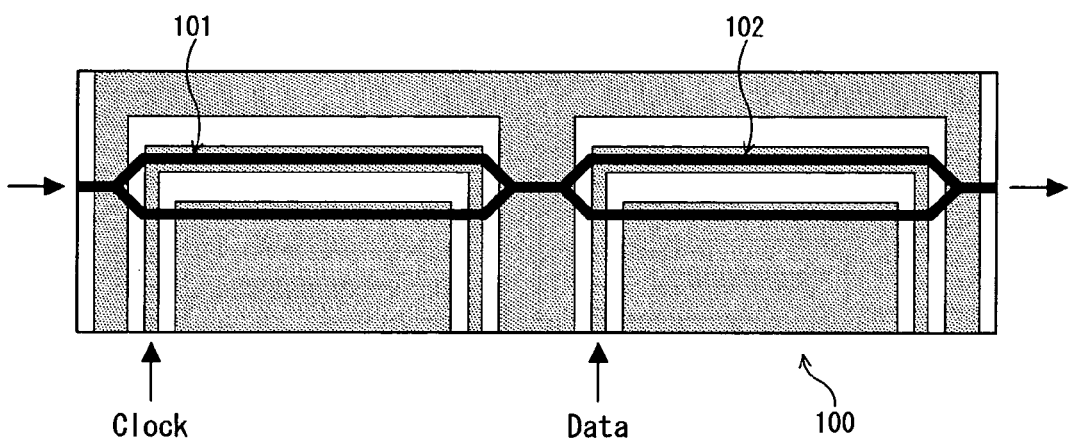
FIG. 10 is a schematic diagram showing the overall configuration of a conventional RZ optical modulator.

The only requirement is to configure the clock modulator 20 so as to output an optical clock signal of 40 GHz on the basis of a modulation curve shown in FIG. 9 upon receipt of the voltage 2Vπ that is double the half-wavelength voltage Vπ, through use of the electric clock signal of 20 GHz.

Particularly, emphasis is placed on a reduction in the drive voltage of the clock modulator 20, and the working length of the clock modulator 20 is made longer than that of the data modulator 30, thereby making an attempt to reduce the drive voltage.

In this case, as shown in FIG. 6, as a result of the mirror 12 being shifted toward the clock modulator 20 of longer working length, the chip length can be shortened, which in turn miniaturizes the chip size. More specifically, as a result of the mirror 12 being placed at a position shifted from the center line X (the center line situated at an intermediate position between the two Mach-Zehnder optical waveguides 20, 30) equidistant from the two Mach-Zehnder optical waveguides 20, 30. As a result, the length of the chip can be shortened, which in turn miniaturizes the chip size. An emitting-side portion 80B of the intermediate waveguide 80 is embodied as a linear optical waveguide, and an incidence-side portion 80A of the same is embodied as a curved waveguide.

The previously-described embodiment is described by taking the RZ optical modulator as an example optical modulator equipped with a plurality of Mach-Zehnder optical waveguides. However, the embodiment is not limited to this optical modulator.

INDUSTRIAL APPLICABILITY

As has been described, the present invention enables realization of a compact optical modulator involving a low drive voltage (e.g., an RZ optical modulator), and hence the invention is considered to be extremely useful.

The invention claimed is:

1. An optical modulator comprising:
   a substrate exhibiting an electro-optical effect;
   a plurality of Mach-Zehnder optical modulators formed on the substrate, each Mach-Zehnder optical modulator comprising an optical waveguide formed on said substrate, and electrodes formed in the vicinity of said optical waveguide, wherein
      said plurality of Mach-Zehnder optical modulators are arranged on said substrate in parallel to each other and connected in series along a propagation direction of light from a first of the Mach-Zehnder optical modulators in the series to a last of the Mach-Zehnder optical modulators in the series, and
      said optical modulator generates a Return to Zero signal by supplying a clock signal and a data signal to modulate an input light.

2. The optical modulator according to claim 1, wherein a mirror is provided at an end face of said substrate, and said plurality of Mach-Zehnder optical modulators are connected in series by way of said mirror.

3. The optical modulator according to claim 1, further comprising:
   a mirror provided on an end face of said substrate; and
   a multimode optical waveguide for connecting said plurality of Mach-Zehnder optical modulators to said mirror, wherein
   said plurality of Mach-Zehnder optical modulators are connected in series by way of said multimode optical waveguide and said mirror.

4. The optical modulator according to claim 2, wherein two Mach-Zehnder optical modulators are provided as said plurality of Mach-Zehnder optical modulators; and said mirror is disposed at a position shifted from a center line situated at an intermediate position between said two Mach-Zehnder optical modulators.

5. The optical modulator according to claim 2, wherein said mirror is made from reflective coating formed at an end face of said substrate.

6. The optical modulator according to claim 5, wherein said reflective coating is a metal film.

7. The optical modulator according to claim 5, wherein said reflective coating is a dielectric multilayer film.

8. The optical modulator according to claim 5, wherein said reflective coating is formed at only an area of said end face of said substrate to which said optical waveguide is connected.

9. The optical modulator according to claim 1, wherein said plurality of Mach-Zehnder optical modulators are connected in series by way of a fiber.

10. The optical modulator according to claim 1, wherein said plurality of Mach-Zehnder optical modulators are connected in series by way of a curved waveguide.

11. The optical modulator according to claim 1, wherein each of said plurality of Mach-Zehnder optical modulators has a working length of 40 mm or more.

12. The optical modulator according to claim 1, wherein an interval between a signal electrode and a ground electrode of said plurality of Mach-Zehnder optical modulators is 50 mm or more.

13. The optical modulator according to claim 1, wherein all of electric signal input pads of said plurality of Mach-Zehnder optical modulators are disposed on one side of a chip.

14. The optical modulator according to claim 1, wherein said plurality of Mach-Zehnder optical modulators have bias control electrodes.

15. The optical modulator according to claim 1, wherein two Mach-Zehnder optical modulators are provided as said plurality of Mach-Zehnder optical modulators; and one of said two Mach-Zehnder optical modulators is configured as a clock modulator, and the other Mach-Zehnder optical modulator is configured as a data modulator.

16. The optical modulator according to claim 15, wherein said clock modulator is driven at a frequency which is half a bit rate (an optical clock signal) and a voltage which is double a half-wavelength voltage.

17. The optical modulator according to claim 1, wherein said plurality of Mach-Zehnder optical modulators include at least one dual drive modulator.

18. The optical modulator according to claim 17, wherein said dual drive modulator has a delay section in an input section of said signal electrode.

19. The optical modulator according to claim 1, wherein said plurality of Mach-Zehnder optical modulators are configured so as to have different working lengths each other.

20. The optical modulator according to claim 1, wherein said plurality of Mach-Zehnder optical modulators are configured so as to differ from each other in terms of an interval between said signal electrode and said ground electrode.

21. An apparatus comprising:
   a substrate; and
   first and second Mach-Zehnder optical modulators arranged on the substrate in parallel to each other and connected in series so that light output from the first Mach-Zehnder optical modulator is input to the second Mach-Zehnder optical modulator,
   wherein the apparatus operates as an optical modulator which generates a Return to Zero signal by supplying a clock signal and a data signal to modulate an input light.

22. An apparatus as in claim 21, further comprising:
   a mirror on the substrate, wherein light output from the first Mach-Zehnder optical modulator is reflected by the mirror to an input of the second Mach-Zehnder optical modulator, to thereby connect the first Mach-Zehnder optical modulator to the second Mach-Zehnder optical modulator in series.

23. An apparatus as in claim 22 wherein the mirror is on an end face of the substrate.

24. An apparatus as in claim 21, further comprising:
   a fiber providing light output from the first Mach-Zehnder optical modulator to an input of the second Mach-Zehnder optical modulator, to thereby connect the first Mach-Zehnder optical modulator to the Mach-Zehnder optical modulator in series.

25. An apparatus comprising:
   a substrate;
   first and second Mach-Zehnder optical modulators arranged on the substrate in parallel; and
   means for connecting the first and second Mach-Zehnder optical modulators to each other in series so that light output from the first Mach-Zehnder optical modulator is input to the second Mach-Zehnder optical modulator,
   wherein the apparatus operates as an optical modulator which generates a Return to Zero signal by supplying a clock signal and a data signal to modulate an input light.

* * * * *

UNITED STATES PATENT AND TRADEMARK OFFICE
CERTIFICATE OF CORRECTION

| | | |
|---|---|---|
| PATENT NO. | : 7,155,072 B2 | Page 1 of 1 |
| APPLICATION NO. | : 11/086370 | |
| DATED | : December 26, 2006 | |
| INVENTOR(S) | : Masaki Sugiyama et al. | |

It is certified that error appears in the above-identified patent and that said Letters Patent is hereby corrected as shown below:

Col. 13, line 67, delete "50 mm" and insert --50 µm-- therefor.

Signed and Sealed this

Tenth Day of April, 2007

JON W. DUDAS
*Director of the United States Patent and Trademark Office*